Figure 1:
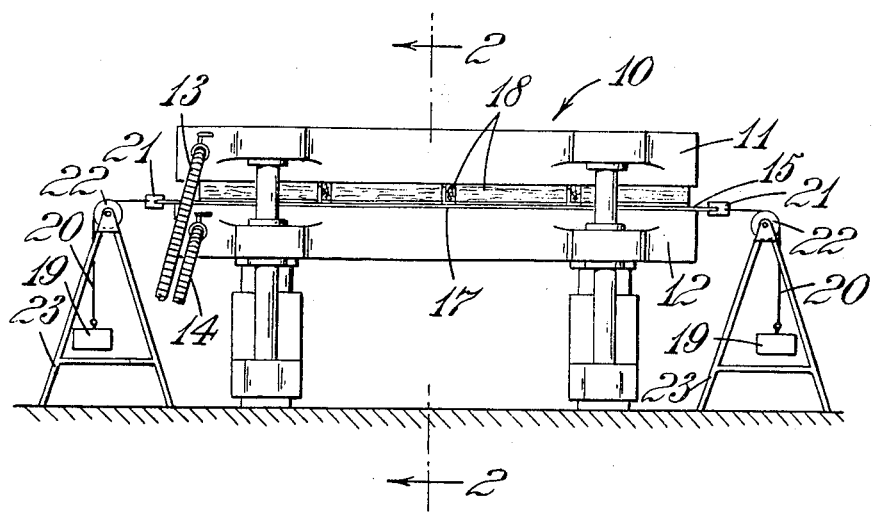

July 17, 1956 P. GRIFFIN 2,755,217
METHODS OF MANUFACTURING METAL STRUCTURES
Filed July 13, 1953

INVENTOR
PAUL GRIFFIN
BY:- Wilkinson & Mawhinney
ATTYS.

United States Patent Office 2,755,217
Patented July 17, 1956

2,755,217

METHODS OF MANUFACTURING METAL STRUCTURES

Paul Griffin, Bristol, England, assignor to The Bristol Aeroplane Company Limited, Bristol, England, a British company Application July 13, 1953, Serial No. 367,691

Claims priority, application Great Britain July 28, 1952

8 Claims. (Cl. 154—118)

This invention relates to a method of attaching structural members such as stiffeners to one surface of a skin material, which may be used for example in the manufacture of aircraft aerofoils or fuselage panels, and concerns a method of the kind in which the skin material is applied to a platen or former with said surface exposed, and the structural members are then positioned as desired in relation to said surface and pressed into contact therewith under a predetermined bonding pressure, a curable bonding medium such as a synthetic thermosetting resin being applied between the surfaces of the structural members and those parts of the surface of the skin to be united thereto, and in which the bonding medium is then cured to unite the structural members to the skin, by raising the temperature of the member-skin assemblage to a predetermined level, the member-skin assemblage being thereafter cooled.

When thin skins are treated in this way it is found that the finished aerofoil or panel has a quilted appearance, the skin tending to bulge at those parts not secured to the structural members. Besides being unsightly this defect can materially increase the resistance of an aerofoil or fuselage at the high flying speeds now common.

Observation suggests that this quilting effect is due in part to several causes. In the first place it is not possible to ensure uniform contact of the whole area of the workpiece with the platen, with the result that the material is heated and expands unevenly, causing buckling. This effect is accentuated by the fact that in carrying out the process on a production scale it is not practical to cool the platen to less than about 90° C. when starting the process, so that the platen is at a substantially higher temperature than the material assembled upon it. In the second place it is found that light gauge sheet material used for the skins will never lie entirely flat by itself but contains "loose" portions which form bulges or "blisters." This effect is frequently increased when the temperature is raised to the curing level by the release of locked-up internal stresses. In the third place the surface pressures used to effect bonding of the parts restrict the free sliding of the workpiece on the platen under the effect of differential expansions. All these effects tend to produce distortions which are forced into a regular pattern by the spaced stiffening members and thereby accentuated.

It has been found that if certain steps are introduced into a method of the kind referred to above, with a view to promoting or permitting the free extension of the skin material, the degree of quilting may be substantially reduced.

To this end, according to the present invention, in a method of the kind referred to above, for attaching structural members to one surface of a skin material, the skin material is continuously or intermittently tensioned in the plane of the skin at least in one direction in said plane, and at least during that part of the bonding process during which the temperature is being raised to said predetermined level. When the skin material is continuously tensioned it is preferred that it is continuously tensioned during the whole of the bonding process and during cooling following the bonding process.

In certain cases, for example when the bonding pressure is not large, it is possible to maintain the skin under sufficient tension to ensure the taking-up of any stretch due to thermal expansion and/or the release of locked-up internal stresses while the bonding pressure is still applied, but preferably, according to a feature of the present invention, the bonding pressure is relieved during some parts of the bonding process, the skin material being tensioned during said parts of the process. Thus, the bonding pressure may be relieved, that is reduced, at intervals during the bonding process to allow the tension on the skin material more easily to take up any stretch in the skin material. It is to be understood however that the bonding pressure is not entirely removed since, as is well known, it is necessary to maintain sufficient bonding pressure to contain any volatiles produced by the curing of the bonding medium.

When the feature of the invention referred to in the preceding paragraph is adopted, it is preferred that the bonding pressure be intermittently relieved at least during that part of the bonding process during which the temperature is being raised to said predetermined level to cure the bonding material, and preferably, also, during cooling of the member-skin assemblage after bonding has taken place. It may also be arranged that when the bonding pressure is relieved the skin tension is applied, and vice versa, although if preferred the skin may, of course, be continuously tensioned throughout the bonding process.

According to another feature of the present invention the skin may be continuously tensioned, and the bonding pressure may be varied in direct proportion to the temperature. In this case, for example, the bonding pressure may be only lightly applied at the commencement of the heating operation, and at the conclusion of the cooling operation, and may be progressively increased and reduced respectively as the temperature is raised to the curing temperature and is thereafter lowered as the member-skin assemblage is cooled.

Figure 2:
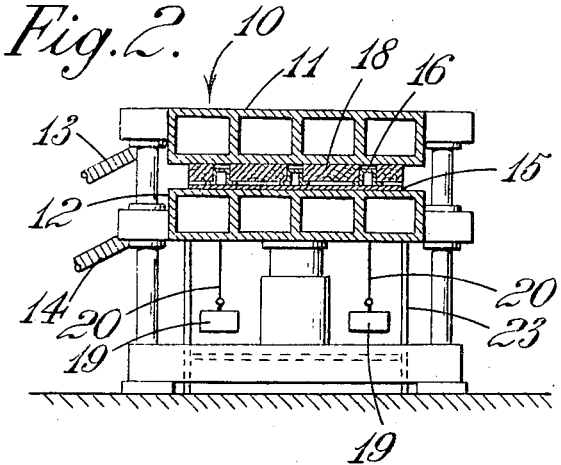

A method in accordance with the present invention for the construction of a flat fuselage panel, will now be described by way of example with reference to the accompanying drawings, whereof:

Figure 1 shows, diagrammatically, apparatus for carrying out the method, the apparatus including a hydraulic press, and Figure 2 is a cross-section on the line 2—2 of Figure 1.

Referring to the drawings, a hydraulic press generally indicated at 10 has platens 11, 12 heatable by steam which may be admitted through pipes 13, 14 respectively. A skin material 15 of light-weight alloy which in a particular example now being described is 0.018 inch thick and approximately 24 inches wide by 150 inches long, is placed on the lower platen 12 with the surface to which the structural members are to be attached, uppermost. The skin 15 is then longitudinally tesioned in its own plane by four weights 19 of about 100 pounds each connected, by flexible wires 20, to clips 21 attached to the ends of the skin, the weights 19 being supported by trestles 23, having rollers 22 over which the wires 20 are passed. The skin may be transversely tensioned in a similar manner if desired, this being advantageous more particularly in the case of skin panels of substantially greater width than in the example given above.

Structural members comprising "top hat" section stringers 16 running longitudinally of the skin 15, and angle section members 17 running transversely of the skin 15 are then placed in position on the skin 15 in desired positions, the skin 15, the stringers 16 and the angle members 17 being suitably coated with a synthetic thermo-setting bonding medium applied between the surfaces of the structural members, and those parts of the surface of the skin 15 to be united. A bonding pressure of about 100 lbs./sq. inch is then applied as evenly as possible to the flanges of the stringers and the angle members by means of the platen 11 through suitable wood or hard rubber packing pieces 18, and then, over a period of 10 to 15 minutes, the temperature of the member-skin assemblage is gradually raised to the curing temperature of 150° C. by admitting steam to the platens 11 and 12, the bonding pressure being momentarily relieved at intervals of 5° C. When a temperature of 150° C. is reached, the temperature is maintained at this level for about 20 minutes to allow the bonding medium to become completely cured, whereafter the temperature is gradually reduced over a period of 5 to 10 minutes to 90° C. the bonding pressure again being relieved at intervals of 5° C. This completes the process, and the bonding pressure is then released together with the tensioning weights and the member-skin assemblage is thereafter removed from the press.

In the example just described, it was found that during the whole process the assembly had acquired a small permanent stretch of the order of 0.1 inch and that the amount of quilting apparent was very much less than would have been the case had no tension been applied.

The process just described is for use on a mass production scale. It will be noted that in order not to occupy the press with the production of one assemblage for a longer period than is necessary the assemblage is cooled only to 90° C. before being removed from the press. As is well understood in the art, it will be appreciated that the assemblage must be cooled at least below the boiling point of volatile products resulting from the curing of the bonding material before the press is opened and the bonding pressure released, since otherwise the volatile products would vaporize on release of the bonding pressure with the danger that during their expansion and escape from the joints between the skin 15 and the structural members 16 and 17 they might rupture the joints. The main volatile product produced by curing the bonding material in the example just described is water and it will be noted that the temperature of 90° C. quoted for the lower limit of the cooling step, which is carried out before the bonding pressure is released, is below the boiling point of the moisture present in the joints due to the curing of the bonding material which would otherwise turn to steam and evolve from the joints with the possible effect described above. This is not to say that the bonding pressure cannot be momentarily relieved, i. e. reduced, at periodic intervals during the bonding process and during cooling as described above. The momentary reduction of the bonding pressure may be carried out without detriment to the joints.

The method just described may be slightly modified if desired, by applying the tension to the skin 15 only when the bonding pressure is relieved at the 5° C. intervals. Thus, for example, the weights 19 may be supported at all times during the process except when the bonding pressure is relieved, the weights then being allowed to hang freely and tension the skin.

In another modification, when the skin 15 is continuously tensioned, the bonding pressure may be varied in direct proportion to the temperature. Thus, at the commencement of the process the bonding pressure may be only lightly applied, the bonding pressure being gradually increased to 100 lbs./sq. inch during the initial 10 to 15 minute period during which the temperature is being raised to the curing temperature of 150° C. and then gradually reduced during the third period of 5 to 10 minutes during which the temperature is being reduced to 90° C. the bonding pressure being maintained at 100 lbs./sq. inch during the intermediate curing period.

If it is required to produce a curved panel by a method in accordance with the invention, the lower platen 12 may be replaced by a platen having a forming surface of the required shape. Tension is applied tangentially to the straight edges of the skin so that the skin is tensioned in its own plane which in this case is of course a curved plane, the tension stretching the skin either over the platen 12, when this is convex, or over the structural members, which in the latter case are held in position by the upper pressure member and resist straightening of the skin under the applied tension. In the case of such curved panels it may be more convenient to obtain the bonding pressure by enclosing a former carrying assembled panel parts covered by a rubber blanket in an autoclave.

I claim:

1. A method of attaching structural members to one surface of a skin material, which method comprises applying the skin material to a former of the required shape with said surface exposed, positioning said structural members on said surface in relation to said surface as desired, a curable bonding medium being previously applied between the structural members and those parts of said surface to be united thereto, pressing the structural members into contact with said surface under a predetermined bonding pressure, raising the temperature of the skin material-structural member assemblage to a predetermined level and maintaining the temperature of said assemblage at said predetermined level for a time sufficient to cure said bonding material and then cooling the assemblage, said predetermined bonding pressure being relieved at intervals during at least that part of the bonding process in which the temperature is being raised to said predetermined level, and said skin material being tensioned in the plane of the skins at least in one direction in said plane and at least when the bonding pressure is less than said predetermined bonding pressure.

2. A method as claimed in claim 1, wherein the predetermined bonding pressure is also relieved at intervals during cooling of the member skin assemblage after bonding has taken place.

3. A method as claimed in claim 1, wherein the skin material is intermittently tensioned, it being arranged that when the bonding pressure is relieved the tension is applied, and vice versa.

4. A method of attaching structural members to one surface of a skin material, which method comprises applying the skin material to a former of the required shape with said surface exposed, tensioning said skin in the plane of the skin at least in one direction in said plane by applying stretching forces to the skin, positioning said structural members on said surface in relation to said surface as desired, a curable bonding medium being previously applied between the structural members and those parts of said surface to be united thereto, applying bonding pressure to press the structural members into contact with said surface, raising the temperature of the skin material structural member assemblage to a predetermined level and maintaining the temperature of said assemblage at said predetermined level for a time sufficient to cure said bonding material, cooling the assemblage, and then releasing the bonding pressure and said stretching forces, said predetermined bonding pressure being relieved at intervals during at least that part of the bonding process in which the temperature is being raised to said predetermined level.

5. A method of attaching structural members to one surface of a skin material, which method comprises applying the skin material to a former of the required shape with said surface exposed, tensioning said skin in the plane of the skin at least in one direction in said plane by applying stretching forces to the skin, positioning said structural members on said surface in relation to said surface as desired, a curable bonding medium being previously applied between the structural members and those parts of said surface to be united thereto, applying bonding pressure to press the structural members into contact with said surface, raising the temperature of the skin material structural member assemblage to a predetermined level and maintaining the temperature of said assemblage at said predetermined level for a time sufficient to cure said bonding material, cooling the assemblage, and then releasing the bonding pressure and said stretching forces, said predetermined bonding pressure being relieved at intervals during that part of the bonding process in which the temperature is being raised to said predetermined level and during cooling of the member skin assemblage after bonding has taken place.

6. A method of attaching structural members to one surface of a skin material, which method comprises applying the skin material to a former of the required shape with said surface exposed, positioning said structural members on said surface in relation to said surface as desired, a curable bonding medium being previously applied between the structural members and those parts of said surface to be united thereto, pressing the structural members into contact with said surface under a predetermined bonding pressure, raising the temperature of the skin material structural member assemblage to a predetermined level and maintaining the temperature of said assemblage at said predetermined level for a time sufficient to cure said bonding material, and then cooling the assemblage, said predetermined bonding pressure being relieved at intervals during that part of the bonding process in which the temperature is being raised to said predetermined level and during cooling of the member skin assemblage after bonding has taken place, and said skin material being tensioned in the plane of the skin at least in one direction in said plane when the bonding pressure is less than said predetermined bonding pressure.

7. A method of attaching structural members to one surface of a skin material, which method comprises applying the skin material to a former of the required shape with said surface exposed, tensioning said skin in the plane of the skin at least in one direction in said plane by applying stretching forces to the skin, positioning said structural members on said surface in relation to said surface as desired, a curable bonding medium being previously applied between the structural members and those parts of said surface to be united thereto, applying bonding pressure to press the structural members into contact with said surface, raising the temperature of the skin material structural member assemblage to a predetermined level and maintaining the temperature of said assemblage at said predetermined level for a time sufficient to cure said bonding material, cooling the assemblage, and then releasing the bonding pressure and said stretching forces, said bonding pressure being varied in direct proportion to the temperature throughout the bonding process and during cooling of the member skin assemblage after bonding has taken place.

8. A method of attaching structural members to one surface of a skin material, which method comprises applying the skin material to a former of the required shape with said surface exposed, positioning said structural members on said surface in relation to said surface as desired, a curable bonding medium being previously applied between the structural members and those parts of said surface to be united thereto, pressing the structural members into contact with said surface under a predetermined bonding pressure, raising the temperature of the skin material structural member assemblage to a predetermined level and maintaining the temperature of said assemblage at said predetermined level for a time sufficient to cure said bonding material, and then cooling the assemblage, said bonding pressure being relieved during some parts of the bonding process, and the skin material being tensioned in the plane of the skin at least in one direction in said plane during said parts of the process and the skin tension being released during the other parts of the process.

References Cited in the file of this patent
UNITED STATES PATENTS

| | | |
|---|---|---|
| 2,259,362 | Young | Oct. 14, 1941 |
| 2,351,350 | Mallory | June 13, 1944 |
| 2,545,704 | Raffel | Mar. 20, 1951 |
| 2,650,185 | Larson et al. | Aug. 25, 1953 |

FOREIGN PATENTS

| | | |
|---|---|---|
| 558,419 | Great Britain | Jan. 5, 1944 |